United States Patent
Chan et al.

(10) Patent No.: US 8,521,988 B2
(45) Date of Patent: Aug. 27, 2013

(54) CONTROL SYSTEM AND CONTROL METHOD OF VIRTUAL MEMORY

(75) Inventors: Chun-Kai Chan, Taipei (TW); Li-Hsiang Liao, Taipei (TW); Ya-Shu Juang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 412 days.

(21) Appl. No.: 12/683,785

(22) Filed: Jan. 7, 2010

(65) Prior Publication Data

US 2010/0185809 A1   Jul. 22, 2010

(30) Foreign Application Priority Data

Jan. 19, 2009   (TW) ................................ 98101953 A

(51) Int. Cl.
   *G06F 12/00*   (2006.01)
   *G06F 13/00*   (2006.01)
(52) U.S. Cl.
   USPC ........... 711/203; 711/100; 711/113; 711/152; 711/154; 711/158; 711/163; 711/166
(58) Field of Classification Search
   USPC ................. 711/203, 113, 100, 152, 154, 158, 711/163, 166
   See application file for complete search history.

(56) References Cited

U.S. PATENT DOCUMENTS

| | | | |
|---|---|---|---|
| 6,012,129 A | 1/2000 | Hartner et al. | |
| 6,467,022 B1* | 10/2002 | Buckland et al. | ............. 711/113 |
| 6,618,797 B1 | 9/2003 | Dery et al. | |
| 7,120,753 B2 | 10/2006 | Accapadi et al. | |
| 2006/0010723 A1 | 1/2006 | Haas | |
| 2006/0259802 A1* | 11/2006 | Sutardja | ........................ 713/300 |
| 2006/0288186 A1 | 12/2006 | Accapadi et al. | |

FOREIGN PATENT DOCUMENTS

CA   101329623 A   12/2008

OTHER PUBLICATIONS

English translation of abstract of CN 101329623 A.

* cited by examiner

*Primary Examiner* — Midys Rojas
(74) *Attorney, Agent, or Firm* — Thomas | Horstemeyer, LLP

(57) ABSTRACT

A control method of a virtual memory is adapted for using in a computer. The control method includes the following steps. First, a plurality of application programs executed in the computer are monitored. Second, the application programs are compared with at least a predetermined program, respectively. Third, the virtual memory of a solid state disk (SSD) is controlled to be turned on or turned off according to a comparing result. Herein, the virtual memory of the SSD is controlled to be turned on or turned off to enhance both lifetime of the SSD and operation efficiency of the computer.

12 Claims, 2 Drawing Sheets

CONTROL SYSTEM AND CONTROL METHOD OF VIRTUAL MEMORY

CROSS REFERENCE TO RELATED APPLICATIONS

This Non-provisional application claims priority under 35 U.S.C. §119(a) on Patent Application No(s). 098101953 filed in Taiwan, Republic of China on Jan. 19, 2009, the entire contents of which are hereby incorporated by reference.

BACKGROUND OF THE INVENTION

1. Field of Invention

The invention relates to a control system and a control method of a virtual memory and, more particularly, to a control system and a control method adapted for a virtual memory of a solid state disk (SSD).

2. Related Art

Nowadays, architectures of all general purpose computers belong to store-program computers. That is, the store-program computer loads instructions (basic elements of programs) to an interior storage space and then executes the instructions in the interior storage space.

In the computer, a storage unit used for storing is generally divided into two types, a volatile storage unit and a non-volatile storage unit. The volatile storage unit may be a cache memory or a random access memory (RAM), and the data stored in the volatile storage unit disappears after the computer is powered off. The non-volatile storage unit may be a disk-type hard disk (called hard disk for short hereafter), and the data stored in the non-volatile storage unit remains after the computer is powered off. The two types of the storage units have different functions. Generally speaking, since access speeds of the cache memory and the RAM are quick, the cache memory and the RAM may be used for executing programs. Since the access speed of the hard disk is relatively slow, the hard disk is adapted for storing programs and data.

However, since application programs which have to be executed in the computer are more and more, to make the memory have enough space to execute the application programs, a virtual memory is developed. The virtual memory technology combines the memory and the hard disk to expand capacity of the memory in the computer. In the computer, a memory management unit (MMU) is usually utilized to make the virtual memory, and it uses part of the hard disk as the memory.

The access of the hard disk has to be done by moving an access arm, rotating the disk, and reading and writing via read-write head, and thus the access speed of the hard disk is relatively slow. Since conventional hard disks have mechanism parts such as a disk, shock resistance has to be strengthened. Thus, a SSD is developed presently.

The SSD is the storage unit basing on the permanent storage units (such as a flash memory) or a non-permanent storage unit (such as a synchronous dynamic random access memory (SDRAM)). Since the SSD does not have the mechanism parts such as the access arm and the disk, the SSD has advantages such as low power consumption, no noise, and high shock resistance. However, the flash memory or the SDRAM has a certain reading lifetime (a limited number of times of reading), and when the lifetime is reached, the data stored therein cannot be read.

In the computer equipped with the SSD, if the virtual memory is turned on, the reading and writing are continuously performed to the SSD, which shortens the lifetime of the SSD. However, if the virtual memory is not turned on, some application programs cannot be opened.

SUMMARY OF THE INVENTION

The invention provides a control system and a control method of a virtual memory with which a virtual memory is only turned on when a specific application program is executed to enhance both lifetime of the SSD and operation efficiency of the computer.

The invention provides the control method of the virtual memory adapted for being performed in a computer. The control method includes the following step. First, a plurality of application programs executed in the computer are monitored. Second, the application programs are compared with at least a piece of comparison data, respectively. Third, the virtual memory of a solid state disk (SSD) is controlled to be turned on or turned off according to a comparison result.

The invention further provides the control system of the virtual memory. The control system of the virtual memory includes a monitor module, a comparison module, and a memory control module. The monitor module monitors a plurality of application programs executed in the computer. The comparison module compares the application programs monitored by the monitor module with at least a piece of comparison data to generate a comparison result. The memory control module controls the virtual memory of a SSD to be turned on or turned off according to the comparison result.

In an embodiment of the invention, the comparison module has a comparison table storing the comparison data therein. The comparison data may include at least a predetermined program name or at least a predetermined program type.

In an embodiment of the invention, when at least the name or the type of one application program of the application programs monitored by the monitor module is the same as a predetermined program name or a predetermined program type included in the comparison data, the memory control module turns on the virtual memory of the SSD. When the application program in accordance with the predetermined program name or the predetermined program type included in the comparison data is closed, the memory control module turns off the virtual memory of the SSD, which is effective when the computer is rebooted.

In an embodiment of the invention, the monitor module monitors the name or the type of the executing application program.

In an embodiment of the invention, the control system of the virtual memory may be a resident program. The resident program may be stored in the SSD of the computer, and cooperating with the operation system (OS) in the computer, it is executed when the computer is rebooted.

As stated above, the control system and the control method of the virtual memory of the invention utilizes the resident program having the monitor module, the comparison module, and the memory control module to be auto-performed after the OS of the computer is booted. The monitor module is utilized to continuously monitor all the application programs opened by the computer. The comparison module compares the name or the type of the monitored application program with the predetermined program name or the predetermined program type to determine whether they are in accordant with each other or not. When the name or the type of the opened application program of the computer is in accordance with the predetermined program name or the predetermined program type included in the comparison data, the memory control module turns on the virtual memory of the SSD. When all the application programs in accordance with the predetermined program name or the predetermined program type included in the comparison data are closed, the memory control module turns off the virtual memory of the SSD. As a result, the virtual memory is turned on only when the specific application program is executed. In general time (the specific application program is closed), the virtual memory is turned off, which avoids making the number of times of performing reading and writing operation on the SSD increase quickly. Thus, the lifetime of the SSD is prolonged, and the problem that some application programs are executed only when the virtual memory is turned on is solved.

These and other features, aspects and advantages of the present invention will become better understood with regard to the following description, appended claims, and accompanying drawings.

DETAILED DESCRIPTION OF THE INVENTION

In a preferred embodiment of the invention, a control system of a virtual memory is adapted for being installed in a computer. The computer has at least a SSD, and it may have a disk-type hard disk used as a storage device. In this embodiment, the control system of the virtual memory may be a resident program which may be stored in the SSD or the disk-type hard disk.

Figure 1:
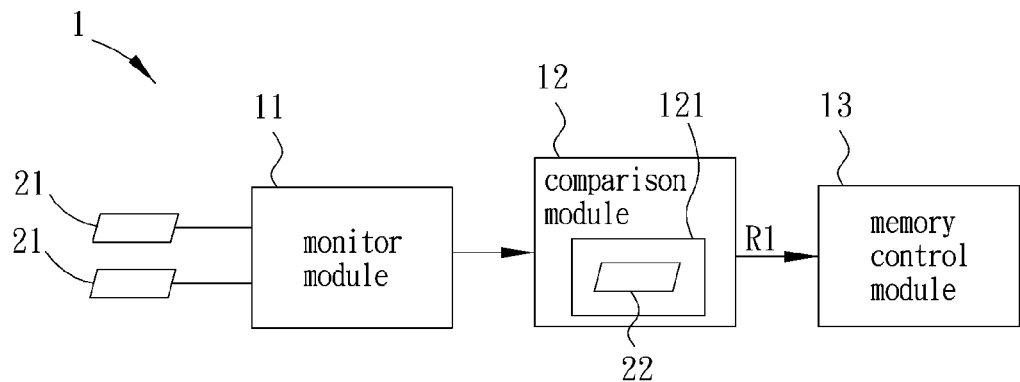
FIG. 1 is a block diagram showing a control system of a virtual memory according to a preferred embodiment of the invention.

FIG. 1 is a block diagram showing a control system 1 of a virtual memory according to a preferred embodiment of the invention. The control system 1 of the virtual memory includes a monitor module 11, a comparison module 12, and a memory control module 13.

The monitor module 11 continuously monitors a plurality of application programs 21 executed in the computer after an OS of the computer is booted. The monitor module 11 may monitor the names or the types of the application programs 21. In this embodiment, the monitor module 11 monitoring the name or the type of the application program is taken as an example.

The comparison module 12 has a comparison table 121 therein. The comparison table 121 stores at least a piece of comparison data 22 which may include a predetermined program name or a predetermined program type. The application program having the predetermined program name or the predetermined program type can occupy large space of the memory (such as the name or the type of a graphic program or a television (TV) program). The comparison module 12 compares the name or the type of the application program 21 monitored by the monitor module 11 with the predetermined program name or the predetermined program type, respectively, to generate a comparison result R1. In this embodiment, the comparison table 121 can store various kinds of the predetermined program names or the predetermined program types therein. The comparison data 22 may further include a program code. The kind of the comparison data 22 is not limited here.

The memory control module 13 may be a virtual memory control module, and it controls the virtual memory of the SSD to be turned on or turned off according to the comparison result R1 outputted by the comparison module 12. In this embodiment, when the name or the type of the application program 21 is in accordance with the predetermined program name or the predetermined program type included in the comparison data 22, the memory control module 13 turns on the virtual memory of the SSD to open the application program. When the application program 21 in accordance with the predetermined program name or the predetermined program type included in the comparison data 22 is closed, the memory control module 13 turns off the virtual memory of the SSD to decrease read and write frequencies of the SSD. In this embodiment, the virtual memory of the SSD is turned off when the computer is rebooted. Therefore, when the memory control module 13 turns off the virtual memory of the SSD, the computer may be set to be automatically rebooted after it stores the present operations.

Figure 2:
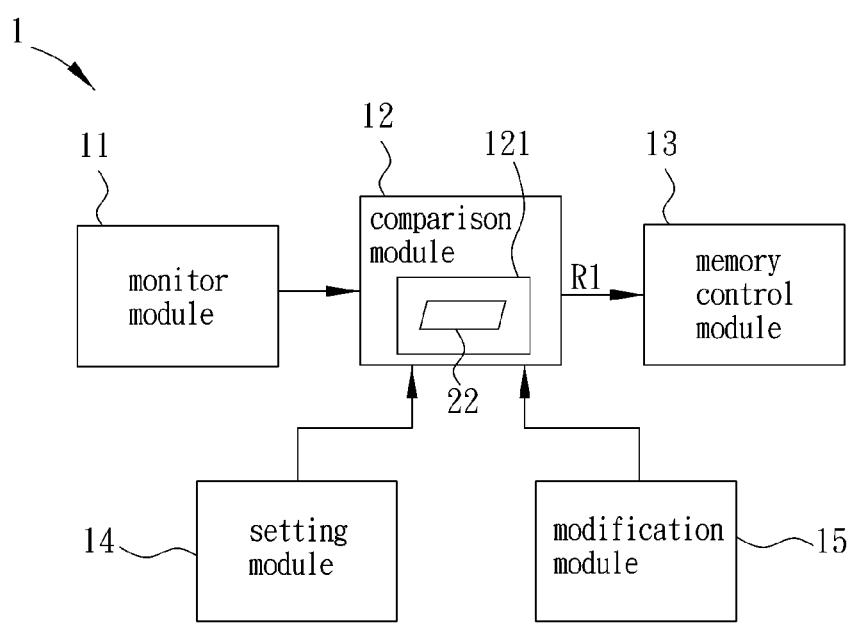
FIG. 2 is a block diagram showing a control system of a virtual memory according to another preferred embodiment of the invention.

As shown in FIG. 2, in this embodiment, the control system 1 of the virtual memory further includes a setting module 14. The setting module 14 is used for setting the comparison data 22 and storing the comparison data 22 in the comparison table 121 of the comparison module 12 to provide it for the comparison module 12 to use. The setting module 14 sets the predetermined program name or the predetermined program type included in the comparison data 22.

Additionally, in this embodiment, the control system 1 of the virtual memory further includes a modification module 15 used for modifying the comparison data 22 stored in the comparison module 12 to update the state of the comparison table 121. The modification module 15 modifies the predetermined program name or the predetermined program type included in the comparison data 22.

Figure 3:
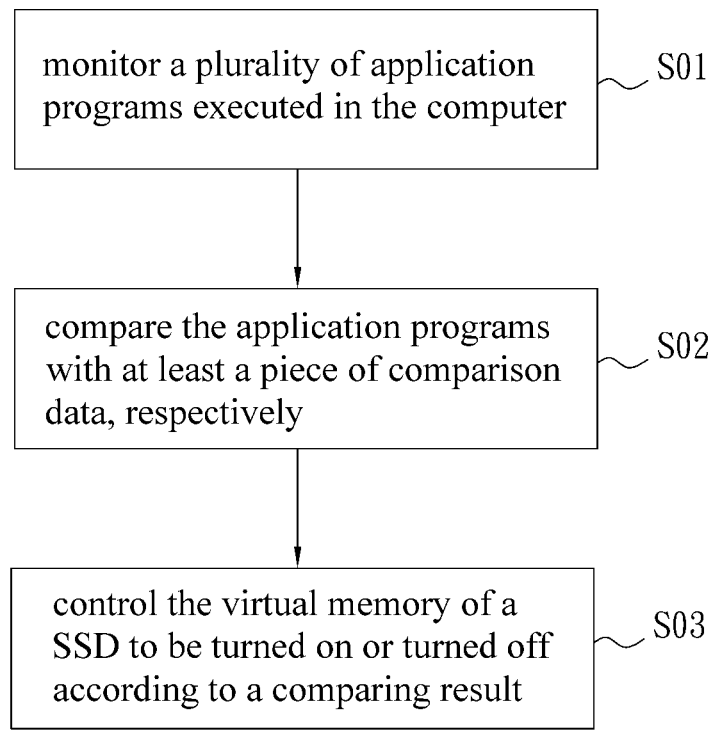
FIG. 3 is a flow chart showing control system of a virtual memory according to a preferred embodiment of the invention.

As shown in FIG. 3, in a preferred embodiment of the invention, the control method of the virtual memory is adapted for being performed in the computer. The control method includes steps S01 to S03 after the OS of the computer is booted.

In step S01, a plurality of application programs executed in the computer are monitored. In step S02, the application programs are compared with at least a piece of the comparison data, respectively. In step S03, the virtual memory of the SSD in the computer is controlled to be turned on or turned off according to the comparison result. Detailed steps of the control method are described in the above embodiment, and it is not described here for a concise purpose.

As stated above, the control system and the control method of the virtual memory of the invention utilizes a resident program having the monitor module, the comparison module, and the memory control module to be auto-performed after the OS of the computer is booted. The monitor module is utilized to continuously monitor all the application programs opened by the computer. The comparison module compares the name or the type of the monitored application program with the predetermined program name or the predetermined program type included in the comparison data to determine whether they in accordant with each other or not. When the name or the type of the opened application program of the computer is in accordance with the predetermined program name or the predetermined program type included in the comparison data, the memory control module turns on the virtual memory of the SSD. When all the application programs in accordance with the predetermined program name or the predetermined program type included in the comparison data are closed, the memory control module turns off the virtual memory of the SSD. As a result, the virtual memory is turned on only when the specific application program is executed. In general time (the specific application program is closed), the virtual memory is turned off, which avoids making the number of times of performing reading and writing operation on the SSD increase quickly. Thus, the lifetime of the SSD is prolonged, and the problem that some application programs are executed only when the virtual memory is turned on is solved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A control method of a virtual memory of a solid state disk (SSD) preserved for at least one specific program, adapted for being performed in a computer, the control method comprising:
   monitoring a plurality of application programs executed in the computer;
   determining whether the specific program is executed according to the application programs executed in the computer;
   when the specific program is not executed in the computer, controlling the virtual memory of the SSD to be turned off; and
   when the specific program is executed in the computer, controlling the virtual memory of the SSD to be turned on.

2. The control method according to claim 1, wherein a virtual memory function of the SSD is turned off when the computer is rebooted.

3. The control method according to claim 1, further comprising:
   setting at least a predetermined program name or at least a predetermined program type included in at least a piece of comparison data,
   wherein determining whether the specific program is executed is based on the comparison data.

4. The control method according to claim 3, further comprising:
   modifying at least a predetermined program name or at least a predetermined program type included in the comparison data.

5. A control system of a virtual memory of a solid state disk (SSD) preserved for at least one specific program, adapted for being disposed in a computer, the control system comprising:
   a monitor module monitoring a plurality of application programs executed in the computer;
   a determining module coupled with the monitor module for determining whether the specific program is executed according to the application programs executed in the computer; and
   a memory control module coupled with the determining module for controlling the virtual memory of the SSD to be turned off when the specific program is not executed in the computer, and controlling the virtual memory of the SSD to be turned on when the specific program is executed in the computer.

6. The control system according to claim 5, wherein the monitor module monitors names or types of the application programs.

7. The control system according to claim 5, wherein the comparison module has a comparison table storing at least a piece of comparison data.

8. The control system according to claim 7, further comprising:
   a setting module for setting the comparison data and storing the comparison data in the comparison module.

9. The control system according to claim 7, further comprising:
   a modification module for modifying the comparison data stored in the comparison module.

10. The control system according to claim 7, wherein the comparison data comprises at least a predetermined program name or at least a predetermined program type.

11. The control system according to claim 7, wherein the comparison data comprises a program code.

12. The control system according to claim 5, wherein the control system is a resident program.

* * * * *